INVENTOR
ELMER F. PFAFF,
ROBERT W. HENNING

United States Patent Office 3,012,746
Patented Dec. 12, 1961

3,012,746
CONDUIT CLIP
Elmer F. Pfaff, Mantua, and Robert W. Henning, Fairview Park, Ohio, assignors, by mesne assignments, to Olin Mathieson Chemical Corporation, a corporation of Virginia
Original application Oct. 1, 1956, Ser. No. 613,268, now Patent No. 2,961,210, dated Nov. 22, 1960. Divided and this application May 17, 1960, Ser. No. 40,986
3 Claims. (Cl. 248—74)

This invention relates to a fastening assembly and more particularly to a fastening system for conduit clips or other structural members including attaching or holding parts in which a fastener is adapted to be driven by means of an explosive cartridge type of tool. This application is a division of copending application Serial No. 613,268, filed October 1, 1956.

In securing a structural member to a base by means of a fastener, such as a stud or the like, it has been found an advantageous practice to drive the stud through a portion of the structural member and into the supporting base with a suitable explosive powered tool. Such explosively-powered stud driving tools may be of either of two types. One type is a piston type wherein a ram member is directly driven to strike and in turn drive a stud positioned at the tool muzzle. In the other and more common type, the stud is a projectile directly driven by an explosive cartridge through the barrel bore of the tool. The use of either type of tool is contemplated.

Prior to the advent of these tools, it was the general practice to first provide a hole in the structural member for receiving a stud or anchor bolt and then to drive such fastener into the supporting base with either a conventional manually operated driver or power-driven tool. Regardless of how it is driven, the stud is forced through the member and into the base until its enlarged head abuts against the structural member.

There has been the disadvantage with explosive actuated driving tools, that the stud head is often driven against the structural member with too great a force and that a portion of the member will be deformed. This penetrated portion then tends to be flared outwardly on the side opposite the side engaged by the head, while adjacent parts of the member are warped in the opposite direction, resulting in a relatively weak and distorted fastening assembly which is subject to loosening when a force such as a work-load is applied to the structural member. For example, the curved portion of a conduit clip will be backed off from the conduit which then is free to rattle and move. There is the further disadvantage, in driving fasteners of heretofore known systems using explosive cartridges, that the stud will be driven askew of its intended direction and fail to be secured to the base.

In accordance with this invention these disadvantages are avoided by providing an assembly wherein a pointed stud is associated with a sheet metal structural member in such a manner as to be properly guided therethrough and into a supporting body or base during permanent attachment of the structural member to the base and in which the driven fastener is firmly seated in the structural member without any serious distortion of the latter tending to impair its holding function. For the type of tool, which directly drives a stud, the structural member of this invention is imperforate in a boss portion being in upraised relationship with respect to the surface of the supporting base by means of ribs or flanges on the member and extending on one side so as to be positionable between the base and member. All embodiments have a yieldable or plastic boss portion for taking up excess energy which otherwise causes distortion of the structural member. Such portion preferably is also elastic so as to tend to contact the base resiliently.

It is therefore an object of this invention to provide a fastening assembly in which a headed fastener firmly driven into a clip or other structural member as the head of the fastener is tightly driven against the structural member without causing undesired distortion of the structural member.

Another object of this invention is to provide a fastening assembly in which a fastener is preset in a structural member in such a manner as to be positively guided therethrough at least at the beginning while being driven into a base member.

Another object of this invention is to provide a fastening assembly in which a fastener is properly guided by even a relatively thin structural member through which it is driven and is firmly embedded in the structural member.

Another object of this invention is to provide a fastening assembly in which a fastener may more safely and accurately be driven through a structural member.

Additional objects and advantages will be apparent from the following description with reference to the drawing in which.

Figure 1:
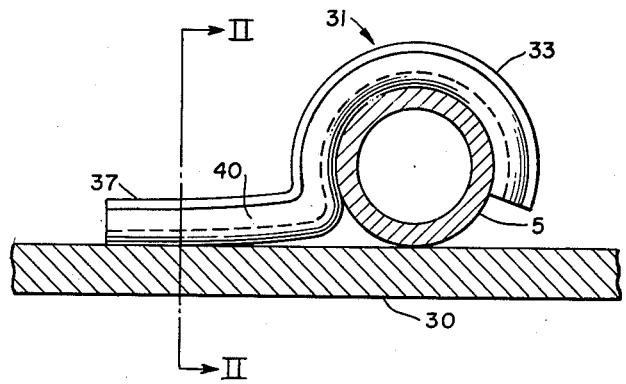
FIGURE 1 is a side view of a preferred embodiment.

This invention involves driving and preferably presetting a fastener such as a stud or a nail into a relatively plastic portion of a structural member such as a conduit clip, electrical outlet box, or the like. The exact nature of the invention will be understood from the description of the embodiment shown in the figures of the drawing.

The conduit clip is fabricated from a deformable material which is sufficiently elastic so that it will not rupture when it is being extruded or when the fastener head is driven against the boss. Suitable materials for this purpose include low-carbon steels such as SAE 1010–1020, copper, brass, or bronze, and certain classes of vinyl, polyethylene, chlorinated rubber or saran-type plastics. The fastener is harder than the clip. Suitable fasteners may have a Rockwell hardness of from about R/c 48 to about R/c 56 and otherwise suitable for powder actuated tools. A steel fastener of the heat treatable type, for example, having a Rockwell hardness on the surface of R/c 53–56 and a core hardness of R/c 50–52 is satisfactory for use with any of the materials listed above.

Figure 2:
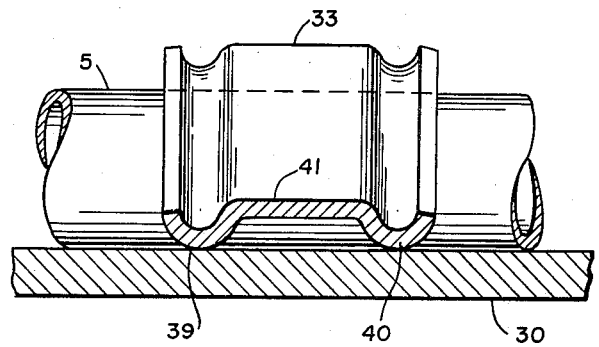
FIGURE 2 is a sectional view on line II—II of FIGure 1.

FIGURES 1 and 2 show an embodiment of the structural member of this invention in the form of a conduit clip 31. It has an arcuate portion 33 for engaging conduit 5 and also an attaching ear or tab 37 having base engaging protrusions such as ribs or flanges 39 and 40 for abutting the base member 30. These flanges may be advantageously embossed in the material of clip 31 adjacent lateral edges thereof at least in tab 37 and even in portion 33. Tab portion 37 also has an outer or stud receiving up-raised section or platform 41. This embodiment is adapted for use with the type of explosive actuated tool which directly projects a fastener or stud from the muzzle of the bore of a barrel portion of the tool inasmuch as platform 41 acts as a shock absorber and stud penetration limiter. The up-raised section 41 is adapted to be pierced and penetrated by the ogival point of such a stud in its passage from the bore of the barrel into the supporting base 30. The up-raised portion 41 together with the flanges 39 and 40 provide the desired yieldable portion in the tab 37 of the clip 31 so as to substantially prevent distortion caused by the impact with the head of the stud. The advantage of this embodiment is that the arcuate portion 33 remains unwarped and in firm contact with the member 5 to be secured on the surface of the base 30 by means of an explosive or any other suitable impact actuated stud-driving tool even though both ribs 39 and 40 are pressed completely and firmly against the supporting base into which the stud has been driven.

Although this invention has been described with particular reference to certain embodiments, materials, and details, various modifications therein will be apparent to one skilled in the art. The invention is therefore not to be limited to such embodiments, materials, or details except as set forth in the appended claims.

What is claimed is:

1. A clip for attaching a conduit, pipe, strip or the like structure to the surface of a base with an explosive driven stud having an enlarged head, comprising a body portion shaped to conform to and partially circumscribe such structure in holding relationship with respect to said base and a plate-like tab portion projecting from an edge of said body portion and adapted to bear against said surface, at least said tab portion having protrusions adjacent opposite lateral edges of said tab portion, other than said edge, projecting on the side of said tab portion opposite said body portion for abutment with said surface of the base whereby the rest of said tab portion is disposed in up-raised yieldable relationship with respect to said surface preparatory to being penetrated by said stud.

2. The clip of claim 1 wherein the protrusions cross the edge and continue along corresponding lateral edges of the body portion.

3. The clip of claim 1 wherein each protrusion is a corrugation forming a channel opening on the same side of the tab portion as the body portion.

References Cited in the file of this patent

UNITED STATES PATENTS

| | | |
|---|---|---|
| 2,150,995 | Tallman | Mar. 21, 1939 |
| 2,673,980 | Ballachey | Apr. 6, 1954 |
| 2,675,546 | Catlin | Apr. 20, 1954 |